Sept. 17, 1935.  W. H. SERGENT  2,014,593

MACHINE FOR WRAPPING CANDY AND INSERTING STICKS INTO THE CANDY

Filed Sept. 28, 1934   13 Sheets-Sheet 1

Sept. 17, 1935. W. H. SERGENT 2,014,593
MACHINE FOR WRAPPING CANDY AND INSERTING STICKS INTO THE CANDY
Filed Sept. 28, 1934 13 Sheets-Sheet 2

Sept. 17, 1935.   W. H. SERGENT   2,014,593
MACHINE FOR WRAPPING CANDY AND INSERTING STICKS INTO THE CANDY
Filed Sept. 28, 1934    13 Sheets-Sheet 3

Sept. 17, 1935. W. H. SERGENT 2,014,593
MACHINE FOR WRAPPING CANDY AND INSERTING STICKS INTO THE CANDY
Filed Sept. 28, 1934 13 Sheets-Sheet 4

Inventor
Walter H. Sergent.
By Charles Still
Attys.

Sept. 17, 1935.  W. H. SERGENT  2,014,593
MACHINE FOR WRAPPING CANDY AND INSERTING STICKS INTO THE CANDY
Filed Sept. 28, 1934  13 Sheets-Sheet 6

Sept. 17, 1935. W. H. SERGENT 2,014,593
MACHINE FOR WRAPPING CANDY AND INSERTING STICKS INTO THE CANDY
Filed Sept. 28, 1934 13 Sheets-Sheet 8

Inventor
Walter H. Sergent.
by
Attys

Sept. 17, 1935. W. H. SERGENT 2,014,593
MACHINE FOR WRAPPING CANDY AND INSERTING STICKS INTO THE CANDY
Filed Sept. 28, 1934 13 Sheets-Sheet 13

Patented Sept. 17, 1935

2,014,593

UNITED STATES PATENT OFFICE 2,014,593

MACHINE FOR WRAPPING CANDY AND INSERTING STICKS INTO THE CANDY

Walter H. Sergent, Middletown, N. Y., assignor to Fair Play Caramels, Inc., Middletown, N. Y., a corporation of New York Application September 28, 1934, Serial No. 745,836

16 Claims. (Cl. 107—4)

This invention relates to a machine for wrapping and inserting sticks in candy.

It is an object of this invention to provide a machine for wrapping caramels or candy and inserting sticks in such wrapped caramel or candy.

A further object of the invention resides in a machine in which candy is formed to proper size, covered or folded with a suitable wrapper and the sticks inserted through a folded end of the wrapper by a continuous process. In other words, while a stick is being inserted in one piece of candy, another piece is being wrapped and moved toward the stick inserting mechanism so that very little time is lost during the operation of the machine.

It is a further object of this invention to provide a stick inserting mechanism in combination with a wrapping machine in which all the parts operate in properly timed relation so that there can be no jamming of the pieces of candy in their path through the machine.

The invention comprises the novel structure and combination of parts hereinafter described and more particularly pointed out and defined in the appended claims.

In the accompanying drawings which illustrate a preferred form of this invention and in which similar reference numerals refer to similar features in the different views.

On the drawings.

Figure 3:
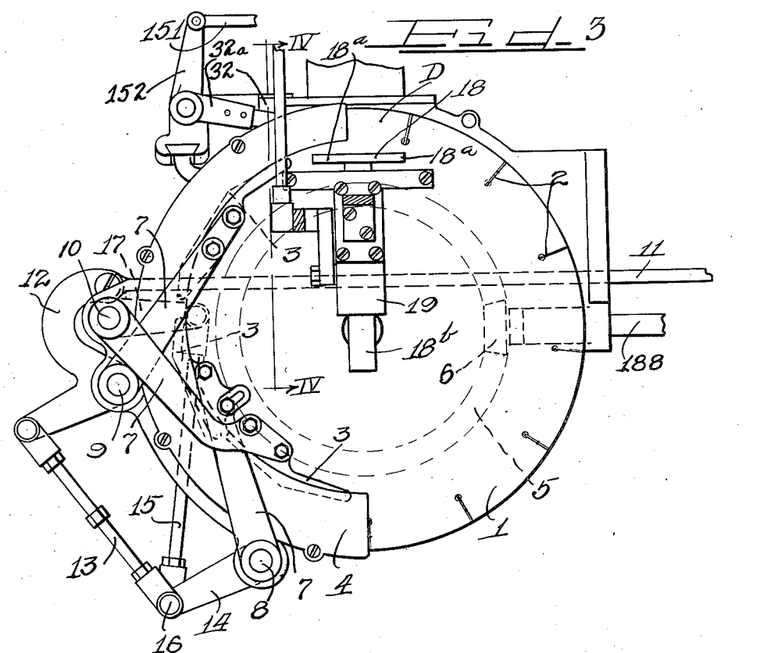
Figure 3 is a fragmentary top plan view of the cutter and forming head constituting a part of the machine.
Figure 4:
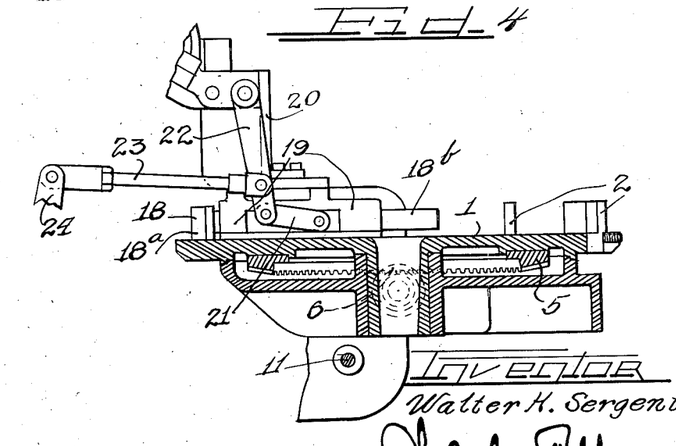
Figure 4 is a sectional view taken upon the line IV—IV of Figure 3, looking in the direction of the arrows.

On the drawings, there has been briefly illustrated certain parts of a caramel wrapping machine in combination with a stick injecting mechanism involving this invention. Parts of the candy forming and wrapping mechanism are old in the art, and for this reason those parts require no detailed illustration except as they relate to the novel combination. The candy dough or batch is placed upon a revolvable cutter head 1 (Figs. 2, 3 and 4) having knives 2 thereon between which parts of the batch are forced or kneaded by a plurality of shoes or kneaders 3 when said knives have rotated into the sphere of action of such kneaders, which is under a suitable guard 4 extending over an arcuate portion of the wheel and down adjacent the edge thereof, as is well known in the art. The lower side of the cutter head carries a gear wheel 5 with which a pinion 6 meshes for actuating the same. A plurality of arms 7 pivoted to the kneaders 3 and fixed upon stub shafts 8, 9 and 10, constitute the actuating means for such kneaders. The shafts 8, 9 and 10 are simultaneously rocked by link mechanism, as will presently appear. An operating link 11 is connected to a two armed device 12 secured upon the shaft 9. One arm of the device is connected to the link 11, while the other arm is connected to a link 13 which in turn is pivoted to an arm 14 secured upon the shaft 8. A link 15 which is pivotally connected to the pivot pin 16 that joins the link 13 and the arm 14 is pivoted at its other end to an arm 17 on the shaft 10 with the result that the reciprocating movements of the link 11 will simultaneously actuate the shafts 8, 9 and 10 and the kneaders.

Figure 1:
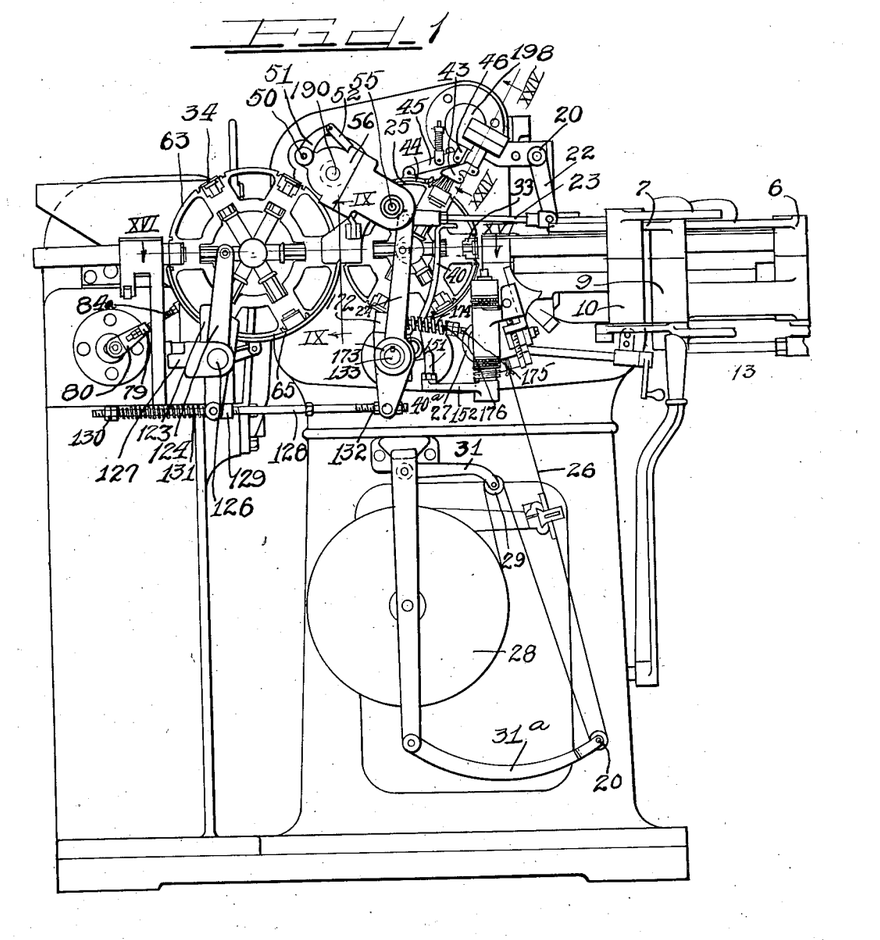
Figure 1 is a side elevational view of a machine for wrapping and inserting sticks in candy involving this invention.

After the kneaders have properly formed a caramel or piece of candy between a pair of knives under the guard, it is severed from the remainder of the batch by the coaction of one of the kneaders and the knives; preferably the last kneader to act upon the caramel is designed for such a purpose. The sheared and formed caramel is now rotated to a discharging station D (Fig. 3) where it is ejected by an ejector 18 which consists of a head portion 18a and a shank 18b which is mounted for reciprocating movements in bearings 19 on a bracket 20 indirectly supported from the frame of the machine. A link 21 is pivotally connected at one end to the shank of the ejector and is connected at its other end to an intermediate part of a lever 22 pivoted at its upper end to the bracket 20. An operating link 23 is connected to the lever 22 and this link 23 is operated by a lever 24. (Fig. 1.)

Figures 16, 17, 18, 19, 20, 21, 22, 23:
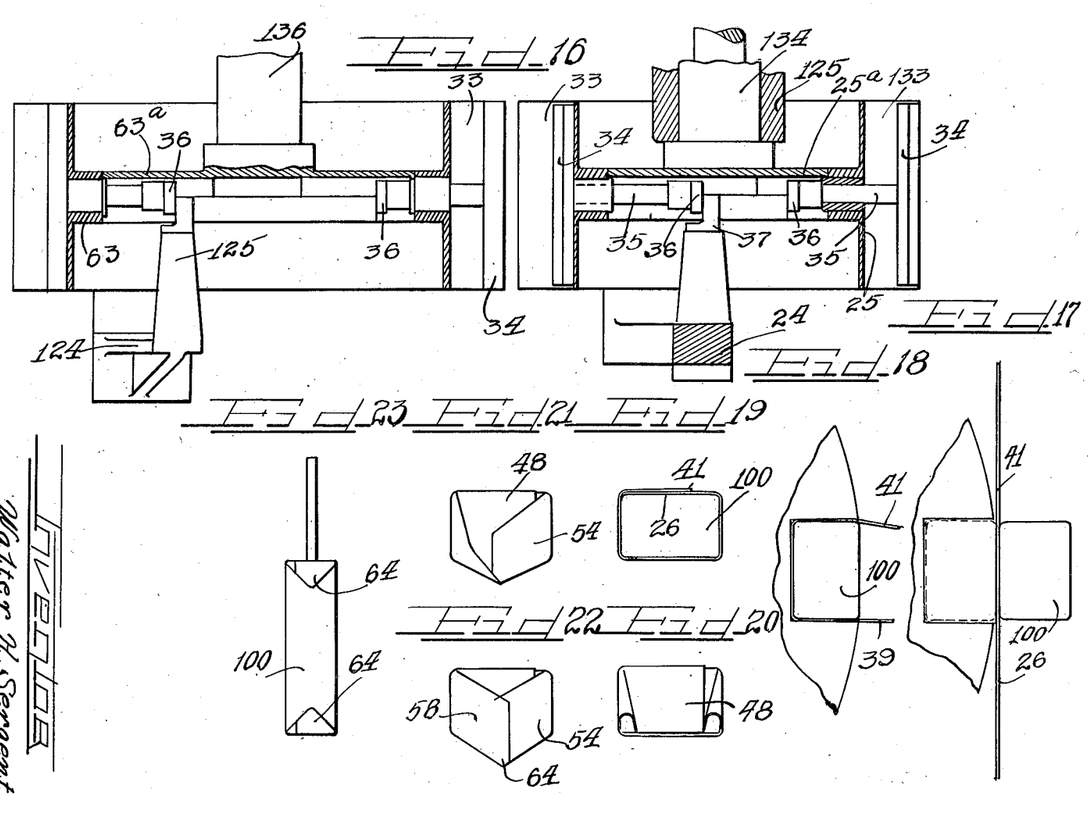
Figure 16 is an enlarged sectional view taken substantially upon the line XVI—XVI of Figure 1, looking in the direction of the arrows.
Figure 17 is a diagrammatic view illustrating the manner of inserting a caramel and wrapper in a pocket in a wrapping wheel.
Figure 18 is a diagrammatic view illustrating the wrapper and caramel after they have been inserted in a pocket.
Figure 19 is a diagrammatic view illustrating the top folds on the caramel.
Figure 20 is a diagrammatic view illustrating the top end fold forced down over the end of the candy.
Figure 21 is a diagrammatic view illustrating the first side end fold forced over the end of the candy.
Figure 22 is a diagrammatic view illustrating the second side end fold forced over the first side end fold.
Figure 23 illustrates a folded piece of candy with a stick inserted.
Figure 28:
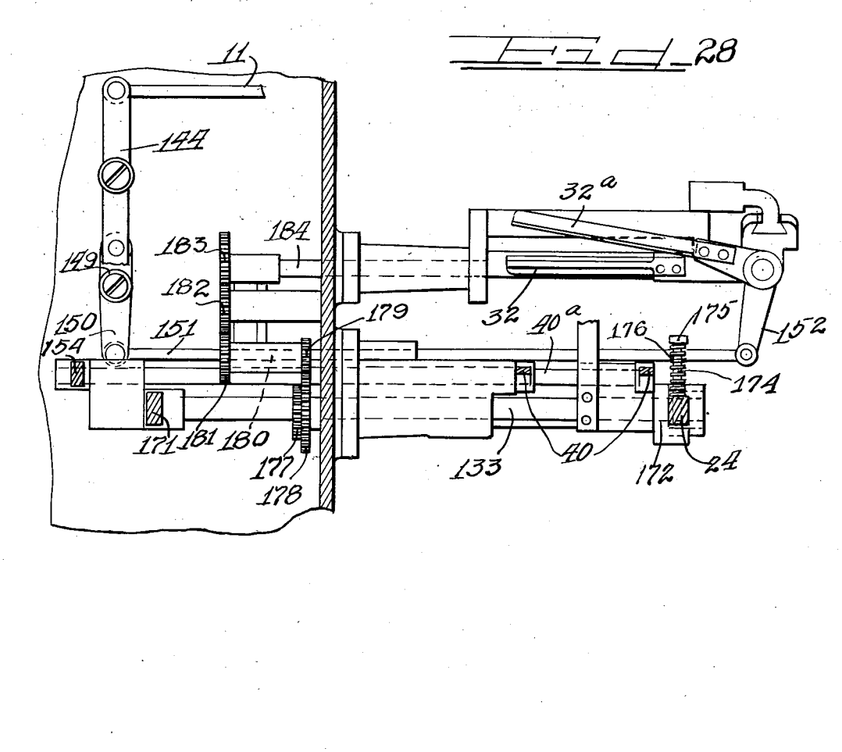
Figure 28 is a sectional view taken substantially upon the line XXVIII—XXVIII of Figure 6 with parts shown in elevation and parts omitted.

When the ejector 18 ejects a caramel or piece of candy from the cutter head 1, it projects the same into a pocket 33 in a wrapping wheel 25. However, before the caramel is projected into said pocket, a paper 26 for use as a wrapper is fed upwardly by feed rolls 27 from a reel 28, the paper passing over rolls 29 and 30 respectively on tension arms 31 and 31a. The paper is fed across the pocket, as shown in Fig. 17, so that as the caramel is injected into the pocket, it will carry the paper wrapper therewith, as shown in Fig. 18. A proper length of paper for this purpose is sheared from the wrapper strip at a suitable time by means of a pair of shears comprising a stationary blade 32 and a movable blade 32a (Figs. 3 and 28) which may be mounted and operated in any suitable manner known in the art. Each pocket 33 in the wrapping wheel contains an ejector 34, the shank 35 of which is slidably and frictionally mounted in the wheel and is provided with a terminal boss 36 for engagement by an ejecting arm or lug 37 (Figs. 5 and 16) on the lever 24. It might be mentioned that the wrapping wheel is intermittently driven by Geneva gearing, as will later more fully appear.

A caramel and its wrapper are inserted into a pocket 33 of the wrapping wheel when the same is brought to rest at the discharging station D. A member 38 pivoted adjacent said wrapping wheel 25 serves to cause the flap 39 (Fig. 18) to assume a substantially vertical position when a caramel is inserted in a pocket of the wrapping wheel. Also hooked members 40 (Fig. 5) swinging into line with front edge of pocket 33 breaks down upper flap 41 (Fig. 18) as caramel is inserted in pocket of the wrapping wheel. Before the wrapping wheel carries the partially wrapped caramel or piece of candy in pocket 33 from loading station "D", hooked members 40 swing back so as not to interfere with the partially wrapped caramel or piece of candy as the wrapping wheel carries it to the next step. The wrapping wheel is driven by a step by step movement, each step bringing a pocket 33 to the cutter ejecting station D.

When the pocket containing a partially wrapped caramel or piece of candy has been advanced a step from the loading station D, a pair of rotatable brushes 42 secured in rotatable holders 43 come into action for folding down the first flap 39 upon the top of the caramel, as will later more fully appear. In advance of the brushes 42, there is a spring pressed ironing member 44 in the form of a curved metal plate adjacent a portion of the periphery of the wheel. The member 44 is pivoted to a link 45 which in turn is pivoted to a bracket 46 on the framework. As the wrapping wheel advances, the caramel passing from under the brushes will pass under the ironing member 44 for pressing down and smoothing the top folds 41 (Figs. 18 and 19) over the fold 39.

The caramel having passed under the ironing member 44 and stopped at the second step after leaving loading station D, the first end folding member 47 is actuated for folding down the first end fold 48 (Fig. 20). The folder 47 is in the form of a bifurcation for folding down the wrapper at each end of the caramel. The folder 47 is supported upon a suitable guide member 49 and is actuated from shaft 50 by means of a crank arm 51 and a link 52 that connects the arm with the said folder 47.

As soon as the first end fold is completed, the second end folders 53, one upon each side of the wheel come into action for making the second end fold 54 (Fig. 21). The second end folders 53 which are in the form of fingers are mounted upon stub shafts 55 carried by downwardly extending wings 56, one upon each side of the wrapping wheel. These fingers are rotated in an anti-clockwise direction, as viewed in Fig. 5, by means of suitable gearing.

As the wheel continues to advance, the caramel in the pocket passes between a pair of pivotally mounted plates 57 (Fig. 5), only one of which is shown, which turn back the third end fold 58 (Fig. 22). Each folder plate 57 is pivotally mounted upon an arm 59 which is journalled upon a bearing lug 60 carried by the framework of the machine. A coil spring 61 (Fig. 5), coiled around a bolt 62 attached to the framework has one end portion bearing against the arm 59 for yieldingly urging the plate 59 against the end of the caramel. It will, of course, be understood that the plate 57 upon the opposite side of the machine is similarly spring impelled toward the end of the caramel.

It will be noted that the nearside plate overlaps a second wrapping wheel 63 substantially similar to the first wrapping wheel. The other or foreside plate 57 upon the other side of the wheel which is a duplicate of the one shown, also overlaps the machine, thereby forming a guideway from one wheel to the other for the passage of a substantially wrapped caramel from the first wrapping wheel to the second wheel.

When the wrapping wheel 25 has rotated a caramel in a pocket thereof from the station D, a distance of 180 degrees, the caramel will be substantially wrapped except for the bottom end tips, and will be in a position between the plates 57 for ejection from the wrapping wheel 25 and into a pocket 33 in the wheel 63. The operation of the wheels is such that they come to rest with a pocket of one in alinement with a pocket in the other. The pockets come into alinement in a horizontal plane and when the same are between the plates 57.

From an inspection of Figs. 1 and 16, it will be observed that when a caramel is projected into a pocket in the wrapping wheel 25, the lever 24 is operated for ejecting a caramel from the diametrically opposite pocket in said wheel through the instrumentality of the ejecting arm 37 on such lever and which arm engages the rear face of the boss 36 on the ejector shank 35, as clearly shown in Fig. 16.

As the wrapped caramel is ejected into a pocket in the wheel 63, the top of the caramel will rest against the bottom of the pocket which is formed by the ejector disc 34. In other words, the wrapped caramel will be reversed, the top becoming the bottom. Now, as the wheel 63 rotates in a clockwise direction, the tips 64 (Fig. 22) of the folded ends of the wrapper which were directed inwardly upon the wheel 25 will now be directed outwardly through the reversed position of the caramel.

Figure 5:
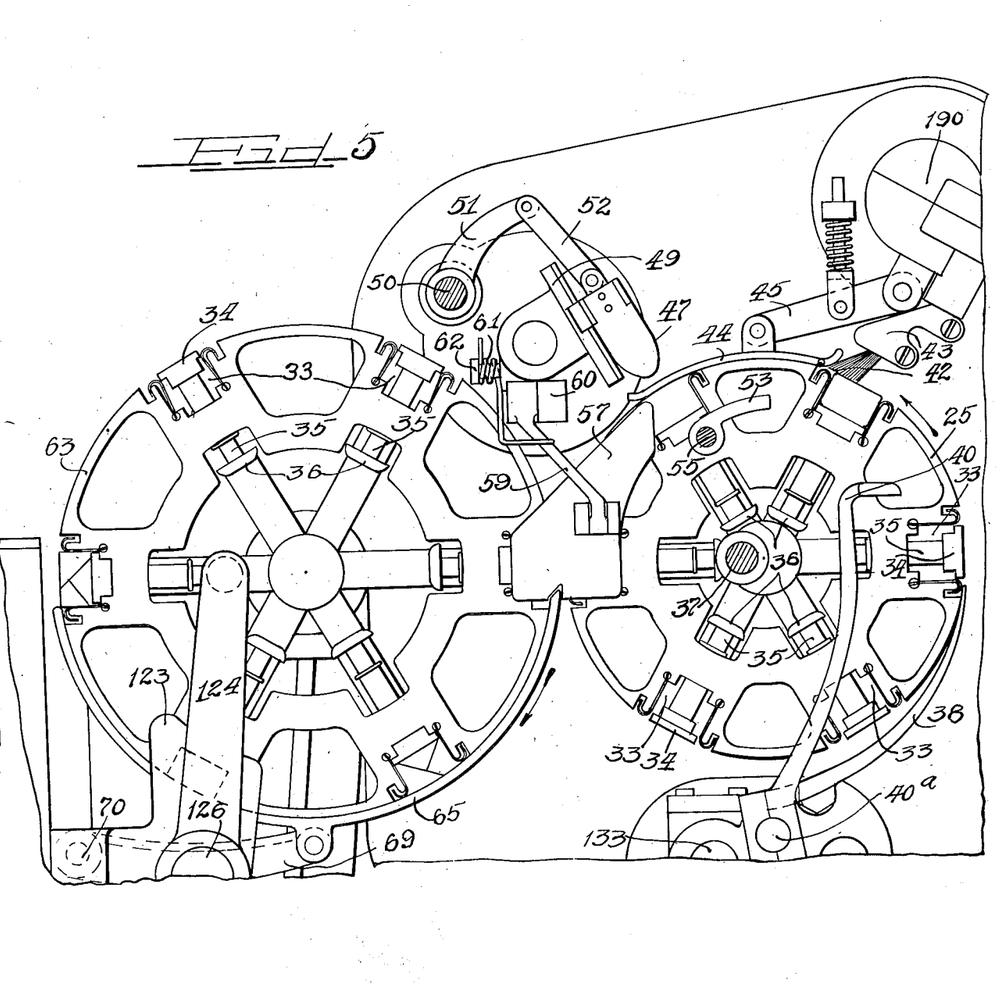
Figure 5 is an enlarged elevational view of the wrapping wheels and adjacent parts constituting a part of said machine.
Figures 9, 10:
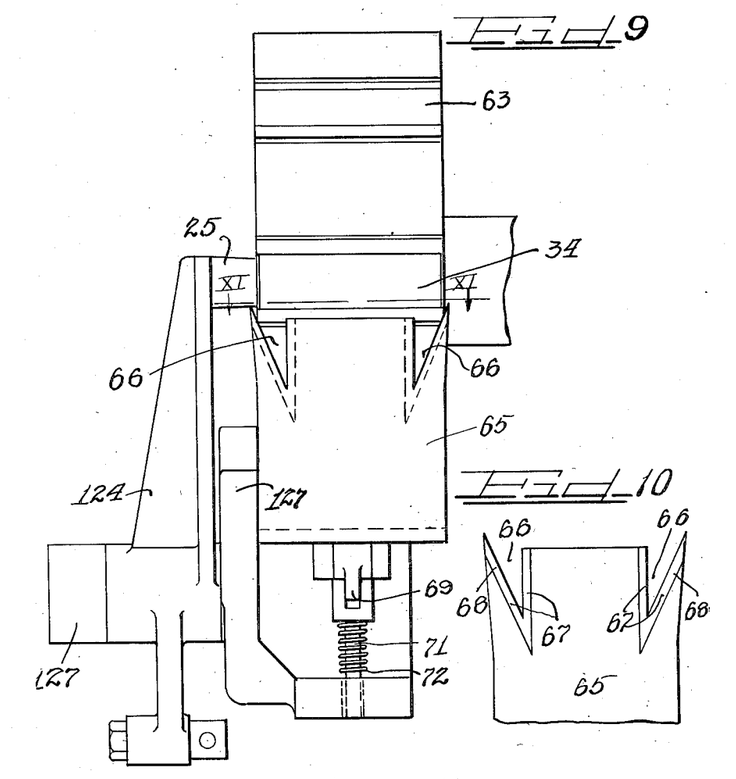
Figure 9 is a view taken substantially upon the line IX—IX of Figure 1, looking in the direction of the arrows.
Figure 10 is a rear view of the last folder.
Figure 11:
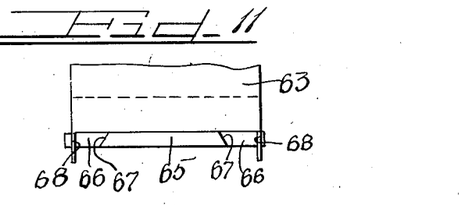
Figure 11 is a view taken upon the line XI—XI of Figure 9, looking in the direction of the arrows.

Means are provided in connection with the wheel 63 for folding the tips 64 of the folded ends of the wrapper against the caramel. To this end there is provided an arcuate ironer 65 which encompasses the lower half of the periphery of the wheel 63, as shown in Fig. 5. The upper end of this ironer, which is adjacent the plates 57, and which plates are cut away to receive such upper end of the ironer, is formed to fold the tips of the end folds against the caramel. To this end, this upper end of the ironer is provided with a notch 66 (Fig. 9) adjacent each edge. These notches have bevelled walls, as indicated at 67, while the outer wall 68 of each notch slopes downwardly toward the center line of the ironer 65. The inner walls of the notches are straight. The bevelled and sloping walls 68 of the notches will turn the tips of the end folds against the caramel, as shown in Fig. 23, when the tips pass into the notches during rotation of the wheel 63. As the wheel 63 advances, the folded tips 64 will of course pass under the shoe 65 and be pressed against the top of the caramel in a pocket.

The ironer 65 is pivotally connected to a link 69 (Fig. 5) at its central point. The free end of the link 69 is pivoted to the framework of the machine, as indicated at 70 (Fig. 5). A spring guide member 71 (Fig. 9) is pivoted to the link 69 and a coil spring 72 surrounding the guide member and yieldingly forces the ironer or shoe 65 against the wheel 63.

Figure 2:
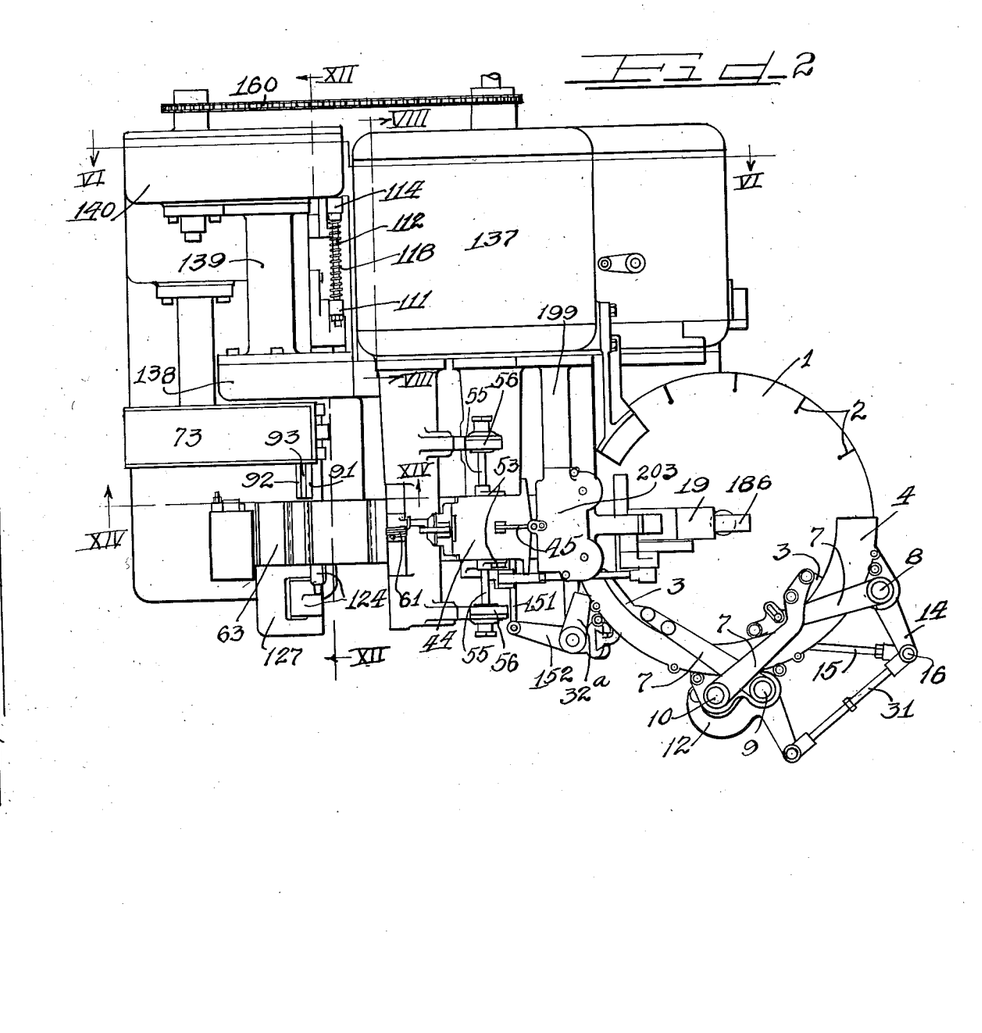
Figure 2 is a top plan view of the machine.

After the tips of the end folds of the wrapper have been folded against the caramel, the caramel is ready to have the stick inserted therein. At a suitable point between the receiving point and the discharging point of the wheel 63, there is a stick mechanism for inserting a stick into one end of the wrapped caramel while the end folds 54 and 58 are held against the ends of the caramel by the pressing action of the shoe 65 against the tips 64. This mechanism is best shown in Figures 2 and 12 to 15. The stick hopper is indicated by the reference 73 and is located to one side of the wheel 63, as shown in Fig. 2.

This hopper comprises a sloping bottom 74 to the lower end of which is secured a bifurcated member 75, and in the bifurcation there is pivoted by means of a pin 77 one end of a stick agitator 76 that forms a continuation of the bottom. The agitator 76 is pivotally connected to a guide link 78 which in turn extends through a lateral lug 79 on a craink arm 80 mounted loosely upon an eccentric pin 81 carried by the end of a shaft 82. The link 78 is connected to said lug 79 by nuts 83, and a coil spring 84a between said lug 79 and a shoulder 84 on the link 78 imparts a yielding thrust against the agitator 76.

The sticks to be inserted in the ends of the caramels are indicated by the reference 85 in the hopper. It will be noted that as they leave the agitator they descend one at a time into a narrow guideway 86 formed by a rear block 87 and the front strips 91a upon opposite edges of block 88. The bottom of the guideway is formed by 30 a member 89 which projects to one side of the hopper and which is supported upon the upper end of an upright 90 within the hopper. A retaining member 91 rests upon the bottom member 89 and forms one side of a guide groove 93 extending beyond the hopper. The other wall of the guide groove 93 is formed by a slat 92 secured to the projecting portion of the member 89.

The block 88 forms a movable stop used to control the feeding of the sticks. To this end it is secured at its upper ends by means of a latch 94 (Fig. 12) pivoted to the hopper as indicated at 95, and having a bevelled tail portion 96 overlapping the member 88 in which position the lower part of member 88 is held away from the member 87 allowing sticks 85 to feed through narrow guideway 86. The upper front end of the hopper is in the form of a bifurcated member 97 having ears 98 upon the legs thereof. The member 88 is offset at its upper end and is pivoted to the ears, as indicated at 99 (Fig. 14). When the latch 94 is swung to one side releasing member 88 springs 96a in part 97 pushing against the upper end of member 88 swings the lower end of said member against member 87 thereby blocking channel 86 so sticks 85 cannot be fed to plunger rod 101 until latch 94 is again turned to secure block 88.

Figure 15:
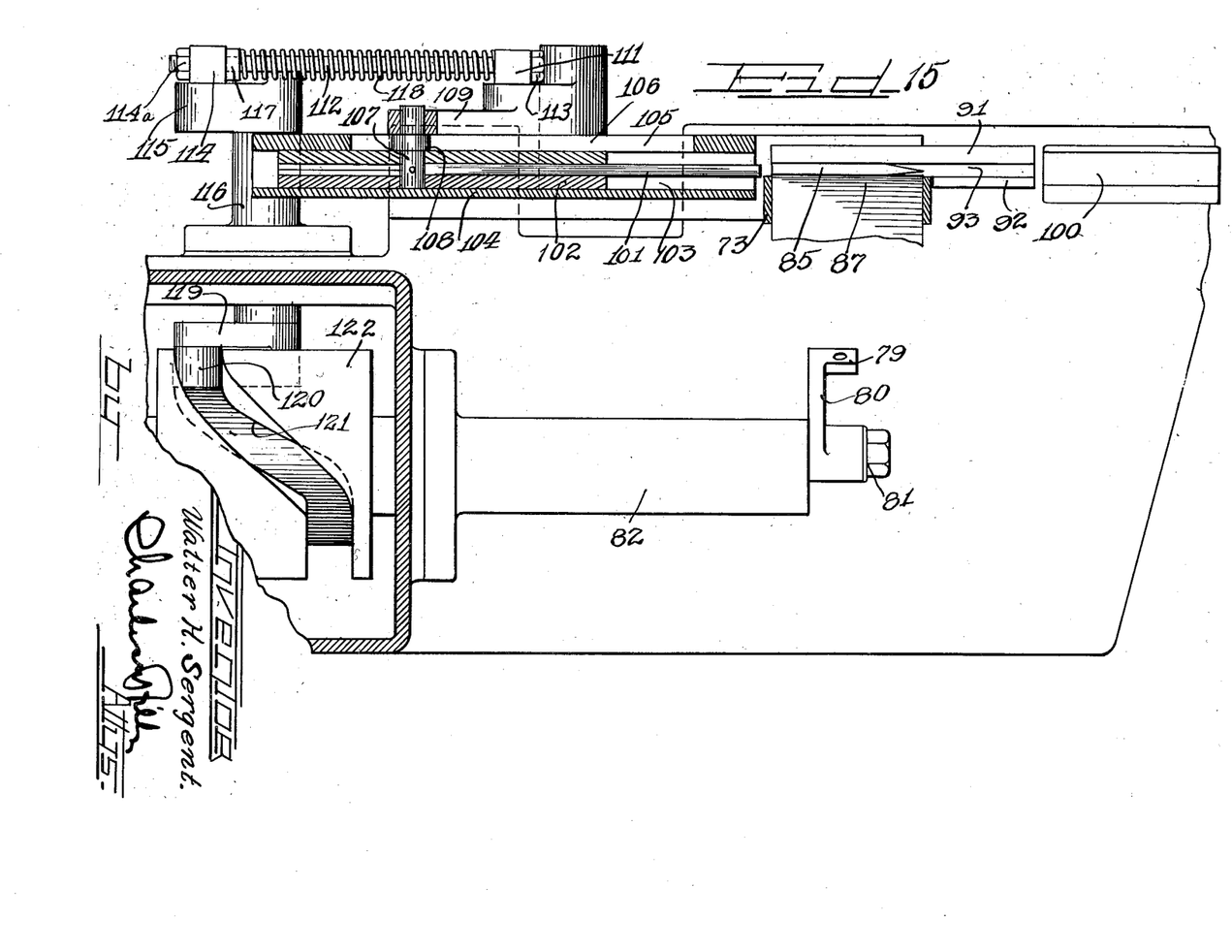
Figure 15 is an enlarged sectional view taken substantially upon the line XV—XV of Figure 12, looking in the direction of the arrows.

In Figure 15, there is shown a portion of the hopper and the stick guideway 93 leading therefrom, with a stick 85 therein and a wrapped caramel 100 adjacent thereto. It will, however, be understood that the caramel will be in a pocket in the wheel 63 when the stick is inserted therein. Adjacent the rear end of the stick 85 and in alinement with the guideway 93 there is a plunger rod 101 which is adapted to be actuated for engaging the end of the stick and pushing the same into the caramel.

Figure 12:
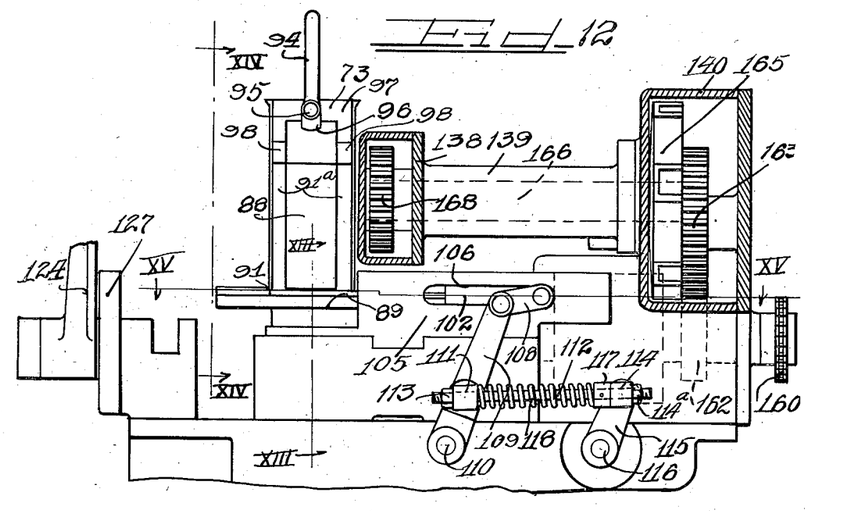
Figure 12 is an enlarged sectional view taken upon the line XII—XII of Figure 2, looking in the direction of the arrows.
Figures 13, 14:
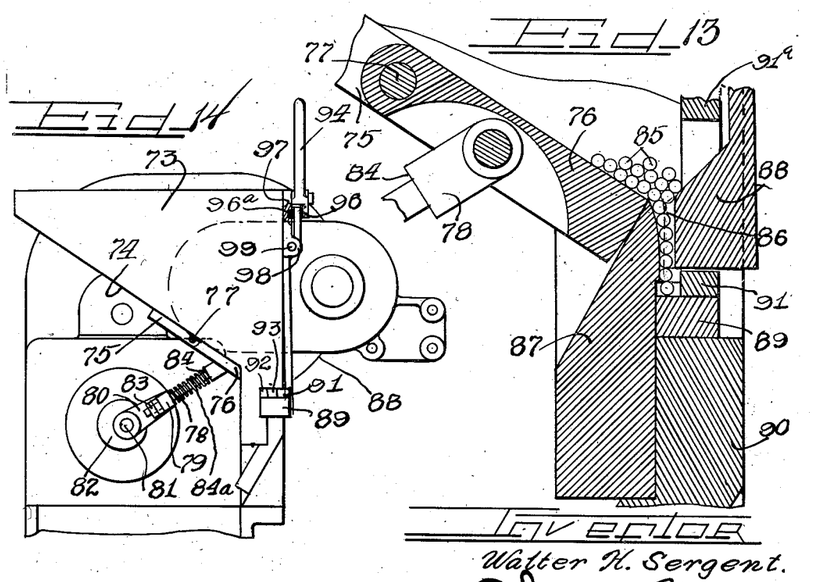
Figure 13 is an enlarged sectional view taken upon the line XIII—XIII of Figure 12, looking in the direction of the arrows.
Figure 14 is a view taken substantially upon the line XIV—XIV of Figure 12, looking in the direction of the arrows.

The plunger rod 101 is secured at its rear portion in a reciprocating member 102 mounted in a guideway 103 formed between two parallel plates 104 and 105, the latter of which is provided with a slot 106, best shown in Fig. 12. A pin 107 secured in the reciprocating member 102 projects through said slot and a link 108 is pivoted at one end to said pin. The other end of said link is pivoted to the upper end of a lever 109 which is fulcrumed upon a pivot stud 110.

The lever 109 is provided with a bearing lug 111, through which a rod 112 extends and to which it is slidably anchored by means of a nut 113. It will be noted that the rod 112 is slidably anchored at one end to said lever 109, while its other end extends through a bearing lug 114 upon a crank arm 115 secured upon a shaft 116. The rod 112 is slidably secured in the lug 114 by a nut 114a. A collar 117 is preferably secured upon the rod 112 adjacent the bearing lug 114 and a coil spring 118 surrounds said rod between the collar 117 and the bearing lug 111. It will be evident that the movement of the crank arm 115 toward the left will be transmitted through the spring 118 to lever 109 for actuating the plunger 101 and its mounting 102.

The shaft 116 terminates in a crank arm 119 at its inner end, as shown in Fig. 15, and this crank arm 119 carries a pin 120 extending into a cam groove 121 in a cam 122 carried by the shaft 82.

In order to support the caramel against endwise movement when a stick is being inserted therein, an abutment plate 123 (Fig. 5) is secured adjacent the opposite side of the wheel 63 and in alinement with the pocket that contains the caramel into which the stick is to be inserted. It might be mentioned that the parts are so arranged that the wheel 63 comes to rest with a pocket in proper alinement with the plunger 101 and the abutment plate 123, and that the stick is inserted in the end of the wrapped caramel while the same is in the pocket at the stick inserting station during the dwell of the wheel 63.

After the stick has been inserted, the wheel 63 will advance to bring the caramel in the next pocket to the stick inserting station, while the pocket containing the caramel with the applied stick will be advanced to the ejecting point which is in the same horizontal plane as the loading or receiving point. When a pocket reaches the ejecting point, an ejector lever 124 will come into action for ejecting the caramel with the stick. The lever 124 has an inwardly extending arm 125 (Fig. 16) positioned rearwardly of the head 36 on the shank 35 of the ejectors 34 carried by the wheel 63 when the same reaches the ejecting point. It might be mentioned that the ejectors in the two wheels are of the same general design and have therefore been similarly designated. The actuation of the lever 124 will actuate the ejectors as they reach the ejecting point for discharging the caramels from the other pockets in the wheel 63 in a similar manner.

The ejector lever 124 is pivoted intermediate its ends upon a stud 126 (Fig. 1) carried by a bracket 127 secured to the framework. A rod 128 slidably extends through a bearing 129 pivoted upon the lower end of the lever 124. The left hand end of said rod is equipped with nuts 130 for confining a coil spring 131 surrounding said rod between said nuts and lever 124. This rod 128 also extends through a bearing 132 pivoted upon the lower end of the ejecting lever 24 which is also pivoted intermediate its ends upon a shaft 133. Consequently, the operation of the ejector lever 24 will cause the actuation of the ejector lever 124 through the rod 128 and spring 131. The lever 124 will be yieldingly actuated through the spring 131.

Figure 6:
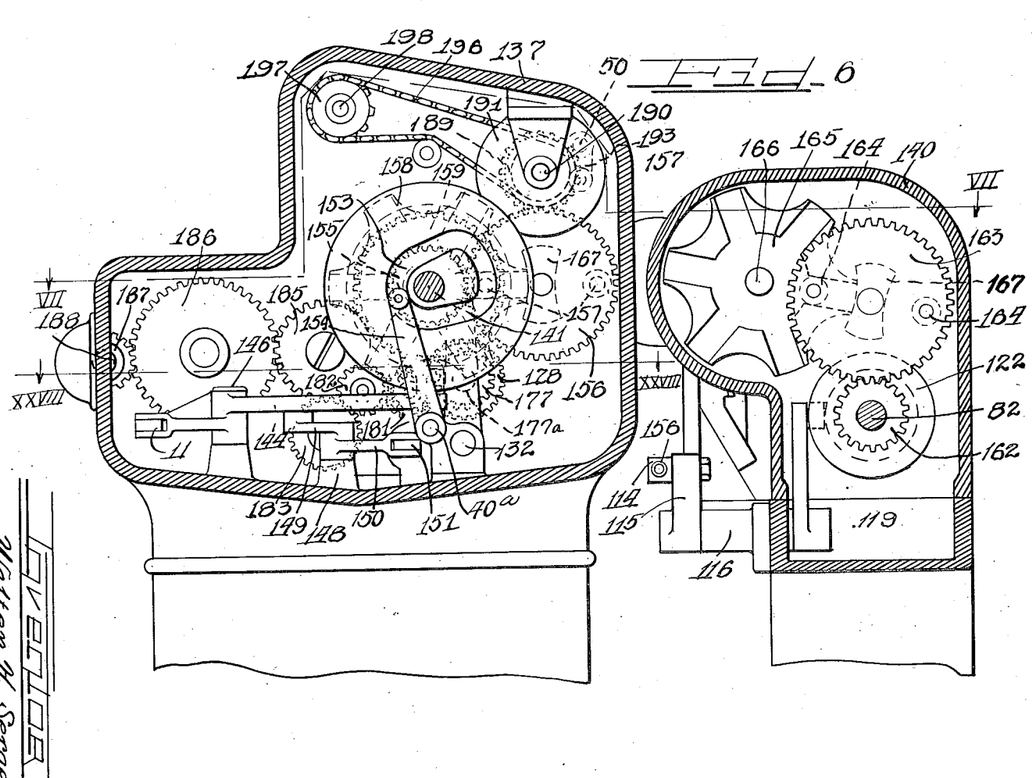
Figure 6 is an enlarged sectional view taken upon the line VI—VI of Figure 2, looking in the direction of the arrows.
Figure 7:
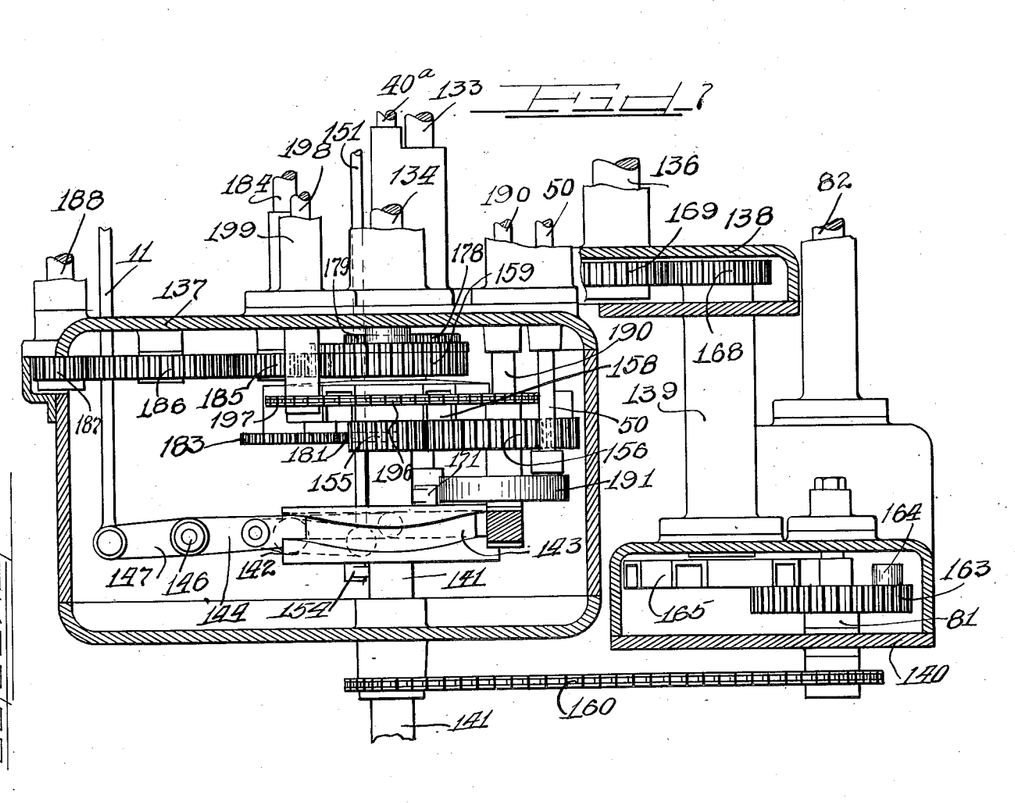
Figure 7 is a sectional view taken upon the line VII—VII of Figure 6, looking in the direction of the arrows.

The wrapping wheel 25 is provided with a web 25a (Fig. 16) to which a shaft 134 is attached that is journalled in a bearing 125. The wheel 63 likewise has a web 63a to which a shaft 136 is attached. It will be noted that these webs are located to the far side of the ejector shanks 35 to allow operating room therefor from one side of the wheels. The shaft 134 extends into a gear casing 137 (Figs. 2, 6 and 7). The shaft 136 supporting the wheel 63 extends into a gear casing 138 (Figs. 2, 6 and 7). The gear casing 138 has a cylindrical bearing sleeve 139 that is attached to a gear casing 140.

Figure 8:
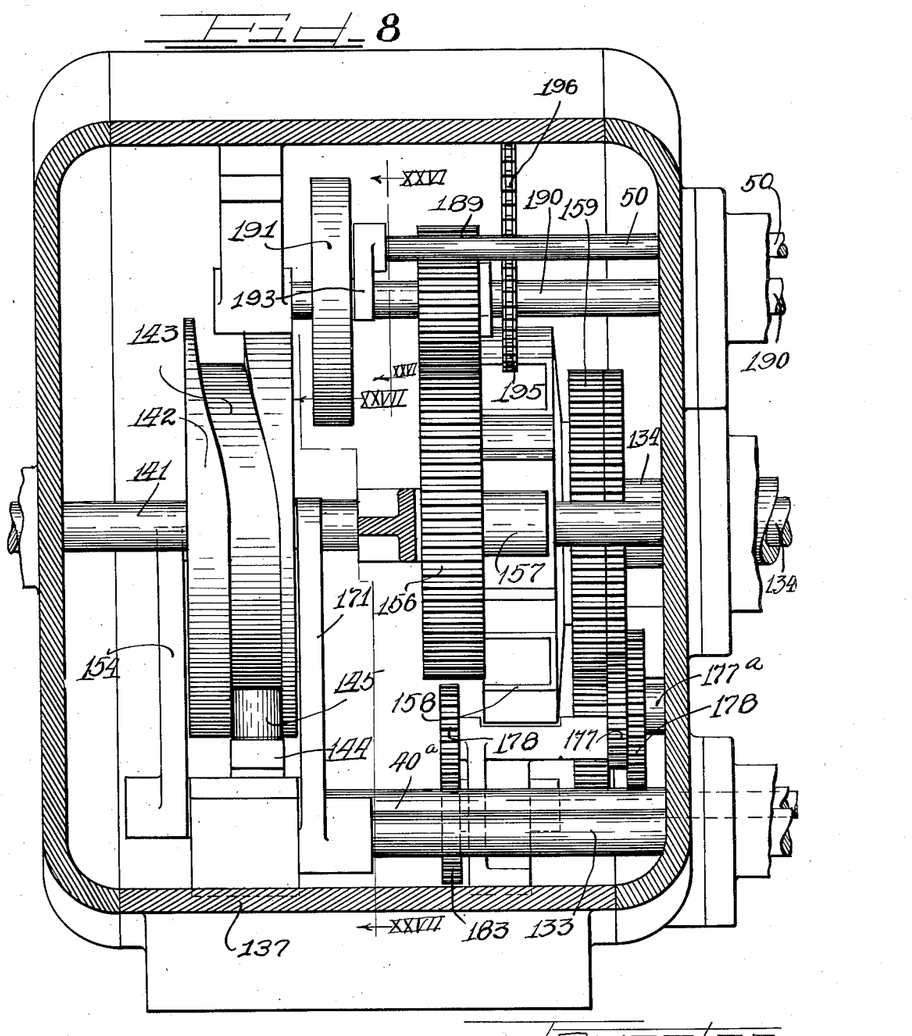
Figure 8 is an enlarged sectional view taken upon the line VIII—VIII of Figure 2, looking in the direction of the arrows.

Power to drive the machine is applied to the main driving shaft 141 which is journalled in the casing 137. A cam 142 provided with a peripheral cam groove 143 is secured upon said shaft. A bell crank lever 144 provided with a stud 145 in said groove is pivoted at the juncture of its arms upon a stub shaft 146 (Figs. 6, 7 and 8). The free arm 147 of said bell crank lever is connected to the aforementioned link 11 for operating the kneaders on the cutter disc 1.

With reference to Figure 6, it will be noted that a stub shaft 148 rises from the casing, a bell crank lever comprising arms 149 and 150 is pivoted upon said stub shaft. The end of the arm 149 is pivoted to the bottom of the bell crank lever 144 with the result that when lever 144 is actuated, the bell crank lever 149—150 will be actuated for operating a link 151 connected to the arm 150. The link 151 is connected to an arm 152 (Fig. 1) on the shear actuating mechanism for the wrapping paper.

Upon the outer face of the cam 142 there is a cam groove 153 (Fig. 27) having an operative connection with a lever 154 which is secured upon the shaft 40a for actuating the hooked folder levers 40. Inwardly of the cam 142, there is a gear 155 on the shaft 141 that meshes with a Geneva gear driver 156 (Fig. 6) which is equipped with pins 157 for engaging a Geneva gear 158 secured upon the shaft 134 that carries the wrapping wheel 25. A spur gear 159 is secured to the Geneva gear 158 for a purpose that will later appear.

The driving shaft 141 is connected by sprocket gearing 160 to the agitator shaft 82 (Figs. 6 and 7) journalled in the casing 140. A gear 162 is secured upon this shaft and meshes with a gear 163 journalled in said casing above the first gear. The gear 163 carries spaced pins 164 for engaging and driving a Geneva gear 165 secured upon a shaft 166. The gear 163 also carries the usual Geneva gear lock 167. The shaft 166 is journalled in the bearing 139 and extends into the casing 138. Within the casing 138, a gear 168 is secured upon the shaft 166 and this gear meshes with a gear 169 secured upon the end of the shaft 136 that carries the wheel 163. Thus it will be apparent that the wheels 25 and 63 are intermittently rotated by a step by step motion for all the different operations to be performed in proper timed relation.

Figures 24, 25, 26, 27:
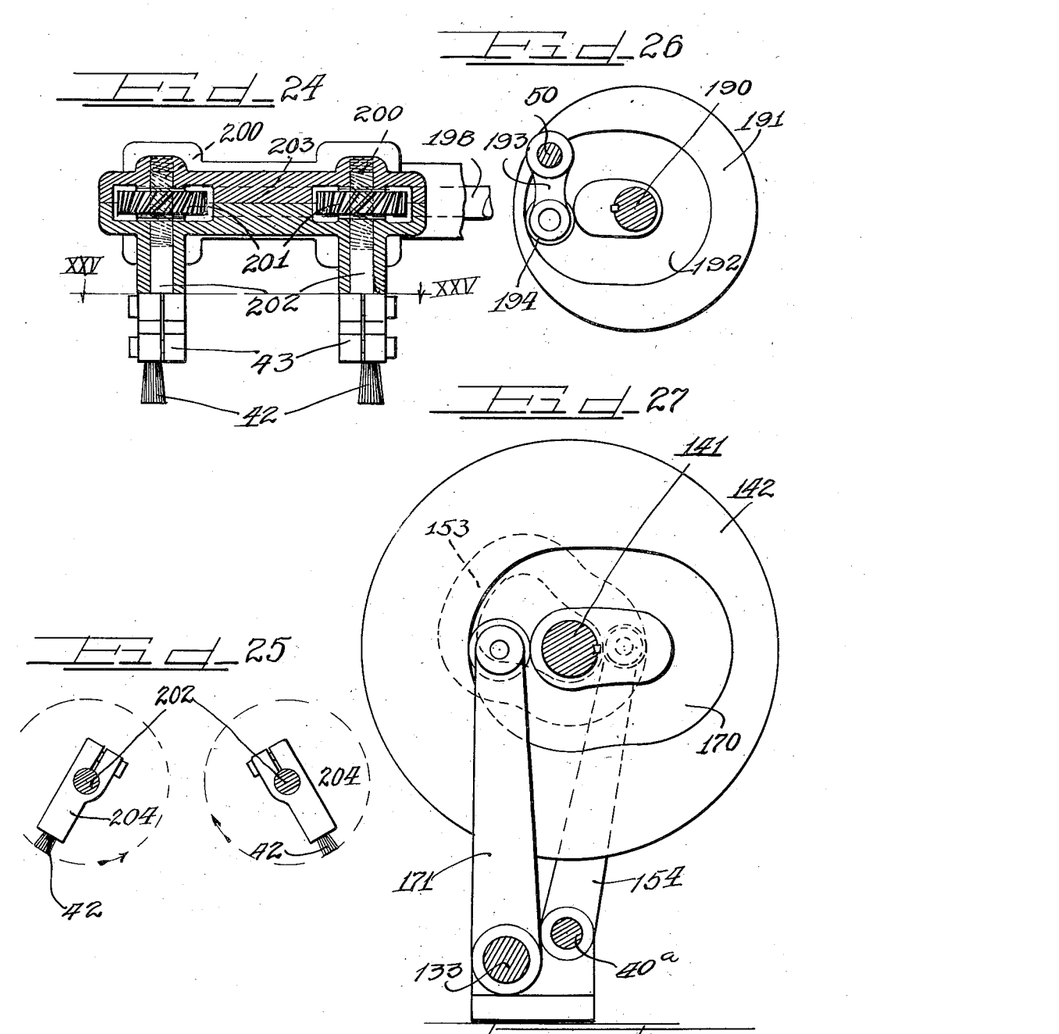
Figure 24 is an enlarged sectional view taken upon the line XXIV—XXIV of Figure 1.
Figure 25 is a sectional view taken upon the line XXV—XXV of Figure 24, looking in the direction of the arrows.
Figure 26 is an enlarged sectional view taken upon the line XXVI—XXVI of Figure 8, looking in the direction of the arrows.
Figure 27 is an enlarged sectional view taken upon the line XXVII—XXVII of Figure 8, looking in the direction of the arrows, with parts omitted.

Reverting now to Figure 27, it will be observed that the inner side of the cam 142 is provided with a cam groove 170 with which a lever 171 has an operative relation. The lever 171 is rigidly secured to the shaft 133 for rocking the same to actuate the ejector lever 24 through the means now to be described. In referring to Figures 1 and 28, it will be observed that an angular member 172 embracing the lever 24 has a hub 173 keyed upon the shaft 133. A rod 174 which is anchored to the angular member 172 extends through an aperture in the lever 24. The other end of the rod 174 is equipped with nuts 175 for confining a coil spring 176 against the lever 24. Consequently, when the shaft 133 is rocked in a counter-clockwise direction, as viewed in Figure 1, it will cause the angular member 172 to move in a counter-clockwise direction and yieldingly carry the lever 24 therewith through the spring 176. It will be noted that the actuation of the ejector lever 24 will operate the ejector 18 on the cutter disc 1 and also the ejector lever 124 that ejects the completed caramel or candy, so the three ejectors are simultaneously operated.

Reverting now to gear 159 on the Geneva gear 158, as shown in Figures 6 and 7, it will be observed that the gear 159 meshes with a gear 177 secured upon a stub shaft 177a that carries a gear 178. The gear 178 meshes with a gear 179 (Fig. 28) secured upon a shaft 180 that has fixed thereon a gear 181 that meshes with an idler gear 182, which in turn meshes with a gear 183 on the shaft 184 that operates the paper feed rolls. The gear 159 also meshes with an idler gear 185 (Fig. 7) and the idler gear meshes with a second idler gear 186 that in turn drives a gear 187 secured upon a shaft 188 carrying the aforementioned pinion 6 for rotating the cutter disc 1.

The aforementioned Geneva gear driver 156 (Figs. 6, 7 and 8) meshes with a gear 189 secured upon a shaft 190 (Fig. 1) that operates the gearing connected to the end tucker fingers 53 (Fig. 5). Upon the shaft 190 there is a cam 191, best shown in Figure 26, that is provided with a cam groove 192. A link 193, provided at one end with a roller 194 located in said groove, is connected at its other end to the shaft 50 (Fig. 8) journalled in suitable bearings on the casing that operates the end tuckers 47, as previously set forth.

A sprocket wheel 195 is secured upon the shaft 190 and is connected by a sprocket chain 196 to a sprocket wheel 197 secured on a shaft 198 journalled in a bearing 199 (Fig. 2) attached to the casing and connected to the brushes 42, as shown in Figure 24. The shaft 198 carries the spaced worm gears 200 that mesh respectively with worm gears 201 secured upon vertical shafts 202 journalled in suitable bearings in a gear casing 203 housing the gears. The brushes 42 are secured in the aforementioned holders 43 which are clamped to the shafts 202 and are offset in relation thereto, as shown in Figures 1 and 25. As these brushes rotate they move over the first flap 39 of the folder and brush the same against the top of the caramel.

In the operation of the machine, a number of caramels or pieces of candy will be continuously passing through the machines with the wrapper thereon in different stages of the folding operation, and whenever a completed caramel is ejected from the wheel 63, another caramel is injected into such wheel and at the same time another caramel is being injected into the wrapping wheel 25 from the cutter disc 1. There is hence a continuous stream of caramels fed from the cutter disc 1 to the wrapping and stick applying mechanism.

Briefly following a caramel on its journey through the machine: it is first formed and cut to proper size on the cutter disc 1 from which it is ejected by the ejector 18 and injected into a pocket in the wrapping wheel 25 carrying the wrapper 26 therewith which has been previously sheared from the paper web, and at the same time forming folds 39 and 41. However, before the caramel and its wrapper are inserted in a pocket, the hooked end folders have swung into line with the front edges of the pocket for breaking down the upper flap 41 as the caramel is being inserted, and as soon as the caramel has been fully injected in the wrapping wheel, the hooked end folders 40 swing back so as not to interfere with the partly wrapped caramel as the wheel 25 advances a step and brings the caramel into the sphere of action of the brushes 42 which will rotate and brush the first top fold 39 against the caramel. Of course, as the wrapping wheel has advanced this first step, it has brought another pocket to the loading station D to receive a caramel.

As the wrapping wheel advances another step, the second top fold 41 will pass under the ironer 44 and be pressed down and the top of the folded wrapper will be ironed. Then, when the wheel pauses again, the top end folder 47 will come into action for making the top end fold 48 and the fingers 53 will be rotated for making the first side end fold 54. Then, as the wrapping wheel advances another step, the plates 57 will fold the second side end fold 58 against the end of the caramel. When the wrapping wheel pauses again, after this last mentioned folding operation, the pocket containing the thus far folded caramel will be in alinement with a pocket in the wheel 63. At this point, the ejector lever 24, which is operated during each pause of the wheels 25 and 63, will eject the caramel from the wheel 25 into a pocket in the wheel 63. It will, of course, be understood that the wheel 63 rotates simultaneously with the wheel 25, but at a slightly higher rate of speed in order to bring the pockets therein which are upon a larger circumference into registry with the pockets of the wrapping wheel at the ejecting station of the wheel 25.

Now, as the wheel 63 advances a step, after it has received a wrapped caramel, the tips 64 of the end folds will be pressed against the caramel by the folder 65 which also acts to iron the wrapper. As the wheel 63 makes a pause, another caramel is fed into the next pocket; then as the wheel 63 makes a second advance, the first caramel will be advanced to the stick inserting station, and while the wheel 63 makes its second pause after receiving the first caramel, the plunger 101 will come into action for inserting a stick in the end of the wrapped caramel. The sticks drop by gravity upon the guideway 93 so that a stick is always in position for engagement by the plunger.

After a stick has been inserted in a caramel, the latter will be ejected by the ejector lever 124 after the wheel 63 has advanced another step and comes to rest.

From the foregoing, it will be apparent that a constant stream of caramels is continuously passing through the machine with suitable pauses to perform the necessary operation. It will be appreciated that the caramel is rigidly confined in a pocket when the stick is inserted therein so that it will not be distorted during such operation.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a machine of the class described, mechanism for wrapping candy with end folds, a rotary wheel having pockets for receiving the wrapped candy, a shoe cooperating with said wheel for folding the tips of the end folds against the candy, in combination with stick inserting mechanism for inserting sticks through an end fold of said candy while the same is in operative relation with said shoe.

2. In a machine of the class described, mechanism for wrapping candy with end folds, a movable device having a pocket for receiving a piece of wrapped candy, means cooperating with said device for confining said end folds and a stick inserting mechanism for inserting a stick through the folds at one end while the same is retained by said means.

3. In a machine of the class described, mechanism for wrapping candy with end folds, a movable device, means for transferring the wrapped candy from said mechanism to said device, a member cooperating with said device for confining the end folds, in combination with mechanism for inserting a stick through the end folds upon one side of said candy while the same is confined by said member.

4. In a machine of the class described, mechanism for wrapping a caramel with end folds, a stick inserting mechanism, a transfer device, means for ejecting a caramel from the wrapping mechanism and transferring the same to said transfer device, means cooperating with said transfer device for folding the tips of said end folds against the caramel, and means for moving said transfer device to present an end of said caramel in operative relation to said stick inserting mechanism.

5. In a machine of the class described, mechanism for wrapping a caramel with end folds, a rotary wheel having peripheral pockets, means for inserting the folded caramel in a pocket of said wheel, a shoe cooperating with said wheel for engaging said end folds, a stick inserting mechanism and means for rotating said wheel and causing the same to pause with the caramel in position before said stick inserting mechanism and in operative relation with said shoe.

6. In a machine of the class described, the combination with mechanism for wrapping a caramel with end folds, of a stick inserting mechanism, a transfer device between said mechanisms, means cooperating with said transfer device for engaging said end folds and means for moving said transfer device for presenting an end of said caramel in operative relation with said stick inserting mechanism.

7. In a machine of the class described, a plunger, means for feeding a stick in alignment with said plunger, a rotary candy wrapping wheel having pockets in operative relation with said plunger, and a shoe cooperating with said wheel adapted for engaging end folds on the wrapped candy and confining the same against the candy while a stick is inserted therethrough.

8. In a machine of the class described, mechanism for wrapping a caramel with end folds, stick inserting mechanism including a plunger, and means for transferring a caramel in operative relation with said plunger, and a member cooperating with said means for engaging an end fold for the purpose set forth.

In a machine of the class described, the combination with a wrapping wheel, of a second wheel in alignment therewith, ejectors associated with said wheels, a shoe associated with said second wheel, a stick inserting mechanism in operative relation with said second wheel and an abutment plate adjacent said second wheel for receiving the thrust of said stick inserting mechanism.

10. In a machine of the class described, a rotary wheel having pockets adapted for receiving wrapped caramels with end folds, a shoe cooperating with said wheel for engaging said end folds during a predetermined movement of said wheel, an abutment member adjacent said wheel, means for intermittently rotating said wheel and causing the same to pause with a pocket adjacent said member and in operative relation with said shoe and stick inserting mechanism including a plunger in alignment with said member.

11. In a machine of the class described, the combination with a wheel having a pocket adapted for receiving a wrapped caramel, an abutment member, means for intermittently rotating said wheel and causing the same to pause with said pocket in registry with said member, means associated with said wheel for engaging a wrapped caramel when said pocket is in registry with said member and stick inserting mechanism including a plunger adapted for inserting a stick in said caramel while the same in is registry with said member.

12. In a machine of the class described, mechanism for inserting sticks in candy including a plunger, an abutment member in advance of said plunger, mechanism for wrapping candy, and a transfer device for receiving a wrapped piece of candy and positioning the same between said plunger and abutment member and means associated with said transfer device for maintaining said candy in its wrapped condition.

13. In a machine of the class described, mechanism for inserting sticks in wrapped candy including a plunger, an abutment in advance of said plunger, mechanism for wrapping candy, an intermittently rotatable wheel having peripheral open sided pockets, means for transferring the wrapped candy to the pockets of said wheel, means cooperating with said wheel for maintaining the ends of said candy in wrapped relation and means for rotating said wheel and causing the same to pause with a pocket between said plunger and abutment, and means for then actuating said plunger.

14. In a machine of the class described, mechanism for wrapping a caramel with end folds, a rotary member having an open sided pocket, means for transferring a wrapped caramel to said pocket, means cooperating with said member for engaging said end folds, an abutment, stick inserting mechanism including a plunger in alignment with said abutment and means for rotating said member and causing the same to pause with said pocket between said abutment and plunger.

15. In a machine of the class described, mechanism for wrapping a caramel, mechanism for inserting a stick in the wrapped caramel including a plunger, a movable device for receiving the wrapped caramel and conveying the same in alignment with said plunger, and means cooperating with said device for maintaining said caramel in its wrapped condition.

16. In a machine of the class described, stick inserting mechanism including a plunger, mechanism for wrapping a caramel, a transfer wheel having peripheral pockets for receiving the wrapped caramel, a shoe cooperating with the lower portion of said wheel, an abutment adjacent said wheel in alignment with said plunger, and means for intermittently rotating said wheel and causing the same to pause with a pocket between said abutment and plunger and in alignment therewith.

WALTER H. SERGENT.